United States Patent [19]

Ambrosio et al.

[11] Patent Number: 4,763,342
[45] Date of Patent: Aug. 9, 1988

[54] DIGITAL PHASE-LOCKED LOOP CIRCUITS WITH STORAGE OF CLOCK ERROR SIGNAL

[75] Inventors: Renato Ambrosio, San Raffaele Cimena; Carlo M. Bruno, Turin, both of Italy

[73] Assignee: Cselt—Centro Studi e Laboratori Telecomunicazioni S.P.A., Turin, Italy

[21] Appl. No.: 934,250

[22] Filed: Nov. 24, 1986

[30] Foreign Application Priority Data

Dec. 17, 1985 [IT] Italy .................................. 68061 A 85

[51] Int. Cl.⁴ ..................... G01R 25/08; H03L 7/18
[52] U.S. Cl. ......................................... 377/43; 377/44; 328/155; 331/1 A
[58] Field of Search .................... 377/43, 44; 328/155; 331/1 A

[56] References Cited

U.S. PATENT DOCUMENTS

| 4,142,177 | 2/1979 | Davis | 377/43 |
| 4,538,119 | 8/1985 | Ashida | 328/155 |
| 4,606,058 | 8/1986 | Kruger et al. | 377/43 |
| 4,626,796 | 12/1986 | Elder | 328/155 |

*Primary Examiner*—John S. Heyman
*Attorney, Agent, or Firm*—Herbert Dubno

[57] ABSTRACT

The digital phase-locked loop circuit extracts the clock signal from a serial flow of coded data by operating so as to determine the phase of the received signal and comparing this phase with that of a locally-generated signal. The error signal obtained from the comparison is digitally filtered and used to correct the phase of local signal. The error with respect to the signal extracted from a prior data stream is stored and used to effect corrections even in the absence of the data flow at the input or in presence of long zero sequences.

4 Claims, 1 Drawing Sheet

DIGITAL PHASE-LOCKED LOOP CIRCUITS WITH STORAGE OF CLOCK ERROR SIGNAL

FIELD OF THE INVENTION

The present invention relates to apparatus for data transmission systems and, more particularly, to digital phase-locked loop circuits.

BACKGROUND OF THE INVENTION

As known, a problem encountered in digital transmission between distant points (e.g. between a satellite and an earth staton) or between near points (e.g. between a telephone exchange and a subscriber) is the receiver synchronization to the transmitter.

This operation is required of every receiving apparatus to correctly estimate the electrical levels of the received signal.

In fact the optimum sampling instant can be determined only by knowing signalling period boundaries, i.e. the period in which a single elementary information is transmitted.

Said instant is the instant at which the effects of noise and distortions introduced by the transmission channel are minimum, and hence the probability of a correct estimate of the received symbol is at its maximum.

This problem is resovled by the use of devices which automatically correct frequency differences and cause the signalling period of the received signal to coincide with that of a locally-generated signal, used as frequency reference.

In this case, the information on the signalling period of the transmitted signal is extracted from the received data flow by the receiver, overcoming the distortions introduced by the channel and frequency and phase differences between remote and local clock generators.

Once this information has been obtained, a signal, duly-positioned within the signalling period, can be generated to estimate the logic level of received signal.

Up to now the device generally used has been the phase-locked loop (or PLL), consisting of a phase comparator, a loop filter and a controlled oscillator (e.g. a VCO=voltage-controlled oscillator).

The phase comparator determines phase differences between the input signals and the local reference; the detected phase error signal is filtered, so as to reduce noise, and is sent to the controlled oscillator, which accordingly adjusts the frequency of the locally-generated signal.

In the past, these three components were implemented by analog techniques.

With the coming of digital techniques a progressive introduction of digital devices into PLL has been noticed.

First a sample-and-hold circuit was introduced after the filter, so as to permit the use of a digital VCO.

Afterwards the phase comparator and the filter, were rendered digital, thus implementing an all-digital PL, the socalled DPLL (digital phase-locked loop).

In a type of embodiment of DPLL, the pase error is determined by evaluating the lead or the lag of the signal emitted by the local generator in comparison with the emitted by the remote generator. This estimate is effected whenever the received signal traverses predetermined electrical thresholds.

The error signal, proportional in amplitude and sign to the phase difference, is filtered and used to perform the necessary corrections of the local generator.

One of the main problems presented by these types of DPLL is that due to synchronism loss when there is a low content of level transitions in the received signal, more particularly when there are long sequences of equal symbols or when the same signal is absent on the line for short periods.

That entails a delay in the detection of the optimal sampling instant at the arrival of the successive valid signals, owing to the time necessary to correctly extract the synchronism signal.

These disadvantages are overcome by use of line encoders, which increase the number of transitions, with consequent increase in the information content of the phase behavior.

However, a high number of transitions entails the necessity of accurately filtering the estimated error, in order to obtain a reliable value of the signal to be used for correcting the local generator. That allows jitter effect minimization. However, the filtering operation requires complex devices and algorithms, to the detriment of convergence speed and integration ease.

Another way of overcoming the disadvantage of synchronism loss is that provided for digital telephone exchanges in connection with higher hierarchical level exchanges.

This method, described in "Synchronizaton system for telephone and data networks" by R. W. Slabon et al, ISS81 pages 41.B 3.1-6, consists of storing the information on frequency difference between a remote and a local clock and using it in case of malfunctioning. The information and its management require, however, the use of a large-sized processor.

OBJECT OF THE INVENTION

It is the object of this invention to overcome the above-mentioned disadvantages and provide a digital phase-locked loop circuit which offers:
the possibility of integration without too large a number of gates;
high jitter reduction;
high resolution and rapid estimate of the received signal phase;
the possibility of use also with inexpensive frequency references (nonselective quartz or ceramic oscillators);
the absence of initial or periodical adjustments;
the possibility of use of the device in different applications by duly dimensioning its parameters; and
the possibility of operation even during a long absence of useful signal.

SUMMARY OF THE INVENTION

The present invention provides a digital phase-locked circuit comprising a transition detector determining transitions of an input signal, a first counter of the local oscillator, started or blocked by the opposite transitions of the input signal, a second counter of the local oscillator, enabled by a type of input signal transition to transfer the executed count to the output, a circuit, able to supply at the output signals relating to the sign of the phase difference between signal of the local oscillator and the input signal, operating on counts executed by the first and second counters, and a digital filter of the signals corresponding to the sign of the phase difference, whose output signals are used to increment or decrement the second counter, in order to obtain at the output of the latter the regenerated clock signal; The circuit of the invention also comprises a counter of correcton signals, incremented or decremented as a function of the signs of the signals outgoing from the digital filter, a frame signal counter, whose overflow signal enables correction signal counter to present at its output the count executed, a logic circuit which presents at its output the number and type of corrections, uniformly distributed in a suitable number of frames on the basis of the counts at the correction-signal and frame-signal counter outputs, the correction signals supplied by the logic circuit being used to increment or decrement the second counter of the local oscillator.

BRIEF DESCRIPTION OF THE DRAWING

Embodiments of the invention will now be described, by way of example, with reference to the accompanying drawing in which.

SPECIFIC DESCRIPTION

The improvements to digital phase-locked loop circuits described hereinafter consist of real-time storage of the frequency difference between the remote and local clock, of its continuous updating and of its use in order to perform the necessary frequency adjustments to the local clock.

The circuit thus improved presents three main operating phases:
  an activation phase,
  a storage phase, and
  a normal operation phase.

In the first phase the circuit performs solely a phase locking to the input signal, operating as a normal digital phase-locked loop. The duration of this phase depends on the speed at which the circuit phase-locks the input signal.

The second phase begins when the incoming-signal phase has already been estimated and the corrections at the loop-filter output give actual information on the frequency difference between the remote and local clocks. This phase lasts Nt frames. The value Nt must be long enough to allow a valid estimate of clock drift. At the end of Nt frames the number of corrections and its sign are stored to be used afterwards.

In the third phase the circuit updates every Nt frames the estimate of the frequency difference and performs the already-stored additoinal corrections, uniformly distributed along Nt frames. As a consequence, during the normal operation it acts in two ways, performing phase estimate and correction, as well as a frequency estimate and correction. In the absence of transitions, phase corrections cease, but the circuit continues to operate by using the stored frequency.

Figure 1:
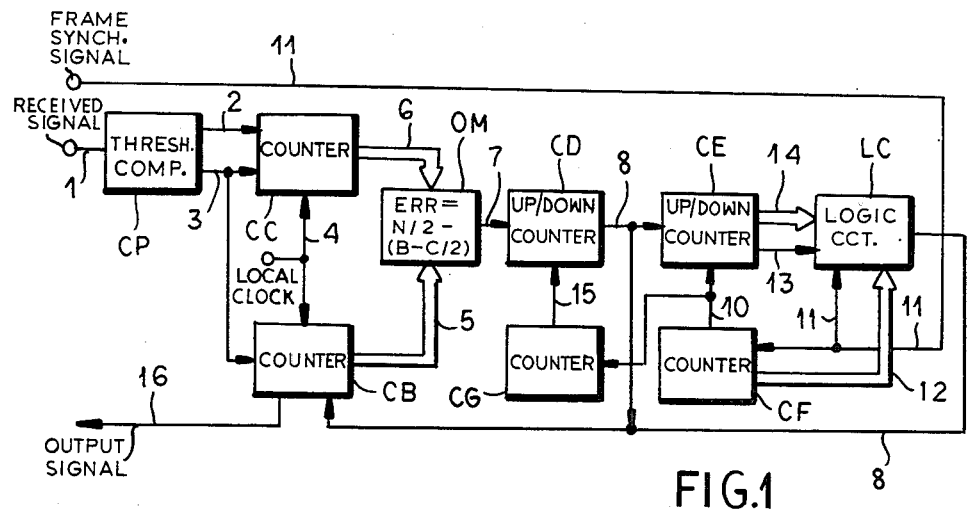
FIG. 1 is a block diagram of the circuit provided by the invention.

The block diagram of the phase-locked circuit according to the invention is shown in FIG. 1.

The received signal, wherefrom timing is to be extracted, is present on wire 1 and the frame synchronism signal on wire 11.

A threshold comparator CP receives at the input the signal on wire 1, compares it with a threshold voltage or with two symmetrical thresholds with respect to zero, depending on whether the signal is binary or is a three-level signal, and supplies at the output on wires 2 and 3 the information relating to transitions of rising or falling edges of the pulses.

A signal indicative of the rising-edge transition, present on wire 2, is used as a starting signal of a counter CC, which is stopped by a successive signal line 3 indicative of the falling-edge transition.

This counter counts with modulus N, whose magnitude depends on the accuracy demanded in the phase estimate, the pulses supplied by the local clock on wire 4. Of course they present a frequency equal to N times the symbol frequency of the received signal. The clock signal on wire 4 accesses also a counter CB, still of modulus N, which freely counts and transfers the counted value to the output on connection 5 when the information relating to the falling-edge transition appears on wire 3. This second counter C1 can be incremented or decremented by the signal on line 8.

Counts supplied by CC and CB are then sent to a block OM, which executes the following operation $$\text{err} = N/2 - (B - C/2)$$

where B and C denote the counts supplied by CB and CC respectively.

The value err obtained represents the phase difference between the signal of local counter CB and the input signal.

Block OM consists of two binary adders, the first of which adds count B to count C, which is sign-inverted and deprived of the least significant bit in order to execute a divide-by-two operation.

The result is sent to the second adder, which inverts its sign and adds it to the predetermined value N/2.

The only sign bit of variable err is used, sent through wire 7 to a variable-modulus up/down counter and stored. At each frame the counter is examined; if it has reached positive or negative overflow value, the corresponding signals are sent on wire 8 to counter CB, which is then decremented or incremented. Counter CD acts on phase error as a simple first-order digital filter.

During activation and storage phases the counting modulus assumes a low value, while during the normal operaton a higher value is used. In this way the stability condition is quickly attained in the first two phases and a better filtering of the error signal is obtained in the third phase.

In addition, an Nt modulus up/down counter is decremented or incremented at each frame, if counter CD has reached positive or negative overflow values. After Nt frames, hence, counter CE contains the number of positive or negative corrections performed. The enabling signal for CE is the overflow signal supplied on wire 10 by a counter CF, also with modulus equal to Nt. Counter CF counts the frame pulses sent on wire 11 and supplies the count obtained on connection 12, then it is reset. This connection goes to a logic circuit LC together with connection 14, on which there is the count effected by counter CE. A wire 13 on which there is the sign bit of count of the same counter CE also is connected to the logic circuit LC. Every Nt frames a convenient number of correction pulses, uniformly spaced in time, are made available at the LC output to wire 8. Said pulses cause counter CB to decrement or increment and hence cause a frequency correction of the output signal on wire 16. In case of high frequency drifts between the oscillators, a correction pulse may appear on wire 8 at every frame.

The counting modulus of counter CD is varied under the control of a counter CG, which emits a signal on wire 15 at the second overflow of counter CF on wire 10. In fact the initialization and the storage phases end at the first and second overflows respectively, and then the normal operating phase begins.

The bit synchronism signal, useful to decode the received symbols, is extracted from counter CB when it attains value N/2 and is presented at the output on wire 16.

Figure 2:
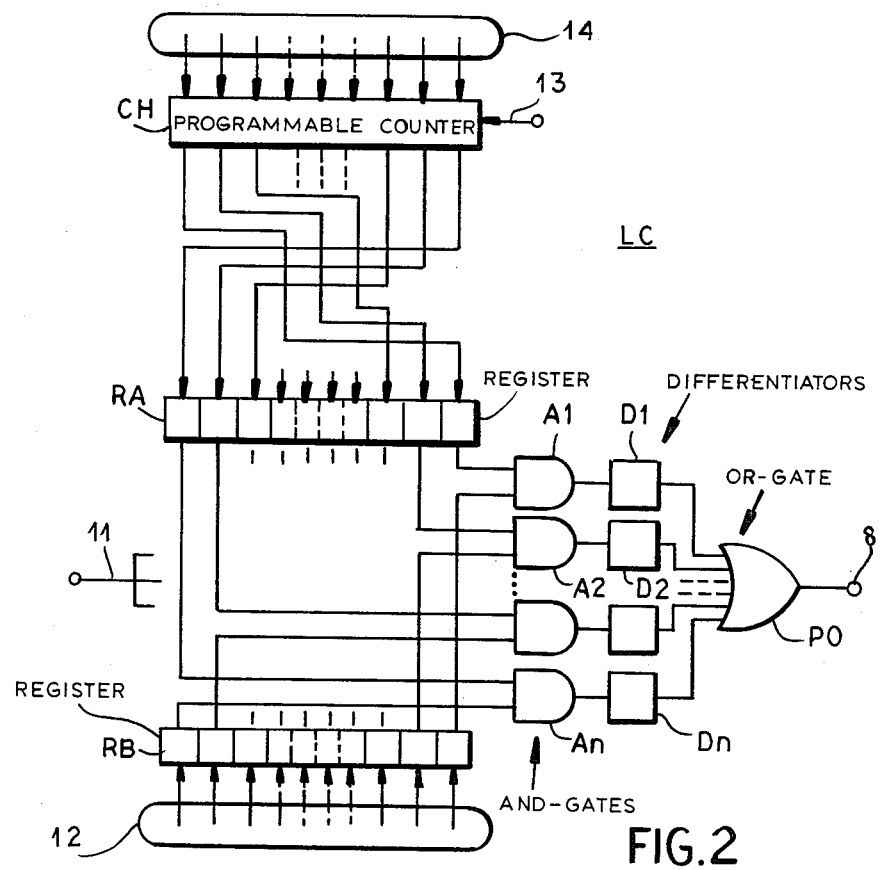
FIG. 2 is a block diagram of the circuit denoted by LC in FIG. 1.

Logic circuit LC is represented in detail in FIG. 2. It is composed of a programmable counter CH, of two registers RA and RB, consisting of a log$_2$ cells, of as many AND gates $A_1, A_2 \ldots A_n$ and of as many differentiators $D_1, D_2, \ldots, D_n$ as the register cells, and of an OR gate PO with the inputs connected to AND gate outputs.

At the end of the storage phase the content of counter CE (FIG. 1) is stored in counter CH through connection 14. During the normal operatring phase, on the contrary, every Nt frames counted by CF (FIG. 1) the sign of the count supplied by counter CE (FIG. 1) on wire 13 is examined and used to increment or decrement the contents of counter CH. The contents of CH is used to load register RA, but is inverted thus as to exchange the most significant bits with the least significant ones.

Register RB is normally loaded with the contents of counter CF (FIG. 1) present on connection 12.

The bits of the corresponding cells of the two registers are sent to as many AND gates A1, A2, . . . An, and all the AND outputs to normal differentiators D1, D2, . . . Dn, so as to supply pulse signals in correspondence with logic-level transitions. All the differentiator outputs are sent to an OR gate PO, at whose output there is a sequence of uniformly-spaced pulses, whose number is equal to the corrections to make within the Nt frames. The logic level of the pulses, whereupon increment or decrement of LC-controlled counters depends, is determined by the sign of the number contained in CH.

When the signal, wherefrom synchronism signals are to be extracted, does not present a frame of its own, and hence the corresponding signals to be sent on wire 11 to CF input (FIG. 1) are not available, a suitable generator is added to supply signals with a suitable frequency with respect to the symbol frequency.

What is claimed is:

1. A digital phase-locked loop circuit for correction of a local clock even in the absence of an input signal from which a remote clock signal can be extracted, comprising:
   a transition detector having an input receiving an input signal controlled by a remote clock and from which a remote clock signal can be extracted and having outputs at which transitions of two opposite types appear as detected by said transition detector;
   counter means having an output connected to a local oscillator generating a local clock and including:
     a first counter of said counter means connected to at least one of said outputs of said transition detector and started or blocked by said transition,
     a second counter of said counter means connected to one of said outputs of said transition means and enabled by a transition of one of said types to transfer a count to an output of said second counter, said first counter having an output, and means for applying said local clock to said first and second counters;
   a phase-difference circuit connected to the outputs of said first and second counters for generating at an output of said phase-difference circuit signals relating to the sign of phase differences between said input signal and said local clock based upon counts accumulated in said first and second counters;
   a digital filter having an input connected to the output of said phase-difference circuit for delivering to an output of said digital filter digitally filtered signals, the output of said digital filter being connected to said second counter for incrementing or decrementing said second counter with corrections to regenerate a clock signal which forms said output of said counter means and serves to control said local oscillator;
   a correction-signal counter having an input connected to the output of said digital filter and incremented or decremented by signals outgoing from said digital filter;
   a frame-signal counter receiving frame synchronization signals and connected to said correction-signal counter to enable said correction-signal counter to present at an output thereof an accumulated count in response to an overflow signal of said frame-signal counter; and
   a logic circuit connected to said output of said correction-signal counter and to an output of said frame-signal counter and having an output at which a signal appears representing the number and types of corrections uniformly distributed over a number of frames as determined by counts accumulated in said correction-signal and frame-signal counters, said output of said logic circuit being connected to said second counter to increment or decrement same, said logic circuit storing a signal representing difference between said local clock and said remote clock signal for control of said local oscillator even in the absence of said input signal.

2. The digital phase-locked loop circuit defined in claim 1 wherein said logic circuit comprises:
   a programmable counter connected to said correction-signal counter and loaded with a count supplied thereby and incremented or decremented depending on a logic level of a signal represented by the sign of the count supplied by said correction-signal counter;
   a first register connected to said programmable counter and loaded with a binary number obtained by inverting a bit position of the number present in said programmable counter;
   a second register connected to said frame counter and loaded with a number present at the output of said frame signal counter;
   a plurality of AND gates each having one input connected to an output of a cell of the first register and another input connected to an output of a corresponding cell of the second register;
   respective differentiators each having an input connected to an output of a respective one of said ANd gates; and
   an OR gate receiving inputs from outputs of all of said differentiators and having as its output, the output of said logic circuit.

3. The digital phase-locked loop circuit defined in claim 2 wherein said frame synchronization signals are locally generated.

4. The digital phase-locked loop circuit defined in claim 2 wherein said frame synchronization signals are extracted from said input signal.

* * * * *